A. R. FRANK.
METHOD OF MAKING NITROGEN COMPOUNDS.
APPLICATION FILED JUNE 8, 1910.
996,011.
Patented June 20, 1911.
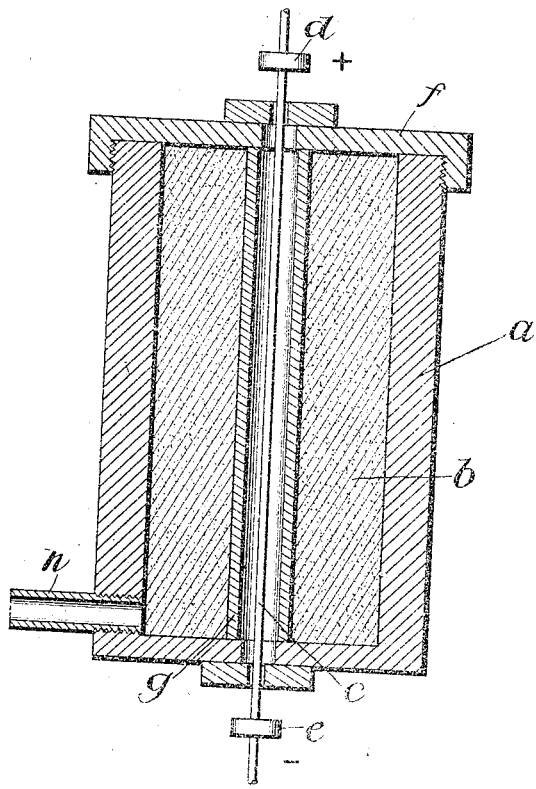

UNITED STATES PATENT OFFICE.

ALBERT R. FRANK, OF HALENSEE, NEAR BERLIN, GERMANY, ASSIGNOR TO SOCIETÀ GENERALE PER LA CIANAMIDE, OF ROME, ITALY, A CORPORATION OF ITALY.

METHOD OF MAKING NITROGEN COMPOUNDS.

996,011. Specification of Letters Patent. Patented June 20, 1911.

Original application filed March 13, 1907, Serial No. 362,086. Divided and this application filed June 8, 1910. Serial No. 565,706.

*To all whom it may concern:*

Be it known that I, ALBERT R. FRANK, a subject of His Majesty the German Emperor, residing at Halensee, near Berlin, Germany, have invented certain new and useful Improvements in Methods of Producing Nitrogen Compounds from Carbids; and I do hereby declare the following to be a full, clear, and exact description of the invention, such as will enable others skilled in the art to which it appertains to make and use the same.

This invention relates to methods of producing a nitrogen compound from carbids, and has for its object to produce such compounds, especially calcium carbid, in a manner to be more fully disclosed below.

This application is a division of my copending application Number 362,086, entitled "Method of producing nitrogen compounds from carbids," and filed March 13, 1907.

In the production of nitrogen compounds by the reaction of nitrogen with carbids, as for example, the carbids of the alkalis or alkaline earths, I have found that it is not necessary for the process that the entire mass of the carbid be brought to the temperature necessary for the reaction; but that is suffices if this temperature be produced at one place in the mass, the reaction then proceeding or continuing under suitable conditions of nitrogen supply, spontaneously throughout the entire mass; a preliminary condition, however, is that the reaction temperature be actually attained at this one place.

In accordance with the present invention the process may be carried out in several ways, of which the following are examples:—

The ignition at one place may be produced by any convenient form of igniter which will raise the temperature at that place to the temperature of the reaction, that is to say, to a temperature lying between 800° and 1100° C., whereupon the reaction will proceed without the application of further heat. The ignition may be accomplished, for example, by means of an electric heater or resistor in the form of a carbon body, or a metallic conductor or semi-conductor placed in a heat insulated receptacle containing the carbid. The heater is then raised to or above the reaction temperature by turning on the electric current. The nitrogen being brought into contact with the carbid in the receptacle the reaction starts in the heated zone and proceeds from the region of the heater until the entire mass of the carbid is converted into the desired nitrogen compound. If the heat insulation of the receptacle be sufficiently effective, the current may be switched off after the reaction has commenced; but if said insulation be not sufficiently effective, heat may be applied, through the resistor or otherwise, during the entire period of the reaction to compensate for the loss of heat.

As an illustration of one method of carrying out my invention, I will select the production of calcium cyanamid ($CaCN_2$) from calcium carbid ($CaC_2$) and nitrogen (N), following the reaction,

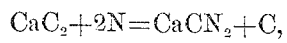
$$CaC_2 + 2N = CaCN_2 + C,$$

which may be carried out as follows:—Into a suitable receptacle, preferably closed, constructed of material of low heat conductivity, provided with means for introducing nitrogen and containing electrical means of developing a temperature lying between dark red and light yellow. I introduce the desired quantity, say 100 kg., of finely divided calcium carbid. This carbid may be ground to any suitable fineness but in practice I have found it is best to grind it to such a fineness that it will, except for a residue of about 9 or 10 per cent., all pass through a sieve having 900 meshes to the square centimeter. A small portion of the carbid immediately adjacent to the electrical heat-developing means, is first raised to the temperature required to initiate the reaction at that point between the carbid and the nitrogen then or previously introduced, and the process of conversion starts. The supply of nitrogen being maintained, the heat spontaneously resulting from the reaction between the carbid and nitrogen at this initial stage which we may call the ignition stage of the process is transmitted to that portion of the mass immediately surrounding the initially heated portion, and is sufficient to promote the reaction in said surrounding portion and there develop a new supply of heat, which, transmitted to an area still more remote from the ignition point is sufficient to promote the reaction there; and so the reaction continues to spread until conversion of calcium carbid into calcium cyanamid is effected throughout the entire mass. This result will be recognized from the cessation in the consumption of nitrogen, which may be observed in any well known manner.

Referring to the accompanying drawings forming a part of this specification in which the figure is a diagrammatic sectional view of an apparatus suitable for carrying out this invention, $a$ represents any suitable receptacle, $b$ the material to be acted upon by nitrogen, $c$ any suitable means for heating said material, for example, a resistor through which a current may be passed; $d$ the positive terminal of a work circuit; $e$ the negative terminal; $g$ a tube or other receptacle through which the resistor $c$ may pass, $f$ any suitable closure for said receptacle, and $h$ suitable means for introducing nitrogen gas.

The method may also be carried out by bringing the carbid, reduced to a finely divided state, and either cold or moderately heated, into contact with highly heated nitrogen: under these conditions the carbid becomes incandescent and reacts with the nitrogen, the supply of which is maintained, the process proceeding as before described. The nitrogen may also be supplied at a pressure above that of the atmosphere or at atmospheric pressure, or it may be drawn into the receptacle at a pressure below that of the atmosphere. In all cases the carbids may be employed either in the pure state or as commercial carbids or mixed with other materials, particularly with such materials as effect a loosening of the carbid mass, such, for instance, as carbonaceous materials which by becoming carbonized form channels or pores in the mass, which channels or pores enable the nitrogen to penetrate readily and completely all the portions of the mass. The carbid may be employed either in the powdered state or broken into lumps. Further, the carbid employed need not be completely formed carbid but may be employed in the form of its components, as, for example, a mixture of oxids, carbonates or other salts of alkalis or alkaline earths and carbon or any carbonaceous substances; or as a mixture of metals and carbon or substances derived from carbon with or without the addition of other organic or inorganic substances, provided these components do not contain compounds having a temperature of decomposition which in itself or in reaction with the other components is higher than the temperature of reaction when nitrogen acts on carbids.

It is to be clearly understood that the word "carbid" as used in this specification and in the claim, signifies and includes not only all pure carbids as such but also carbids in the form of their components, such as a mixture of oxids or other salts or metals with carbonaceous material, as indicated above. The nitrogen employed may be either nitrogen as such, or nitrogen in a combined state, such, for example, as ammonia, provided the temperature at which the nitrogen compound decomposes be lower than the temperature of reaction when nitrogen acts upon carbid. It is also to be understood that the word "nitrogen" as used in this specification and in the claim specifies and includes not only pure nitrogen as such, but nitrogen mixed with small quantities of carbonic acid gas $CO_2$; a trace of oxygen; water vapor as well as nitrogen in the combined state, for example, ammonia.

I am aware that nitrogen compounds have hitherto been produced from carbids by the action of nitrogen upon carbids and I, therefore, do not claim such method or process broadly, but

What I claim is:—

The process of making compounds of nitrogen by reacting on carbids with nitrogen at a suitable temperature, which consists in electrically heating a relatively small part of the carbid mass to a reacting temperature, supplying nitrogen as the reaction proceeds thereby maintaining the temperature and continuing the reaction throughout the mass to be converted.

In testimony whereof, I affix my signature, in presence of two witnesses.

ALBERT R. FRANK.

Witnesses:
HENRY HASPER,
WOLDEMAR HAUPT.